Figure 1:
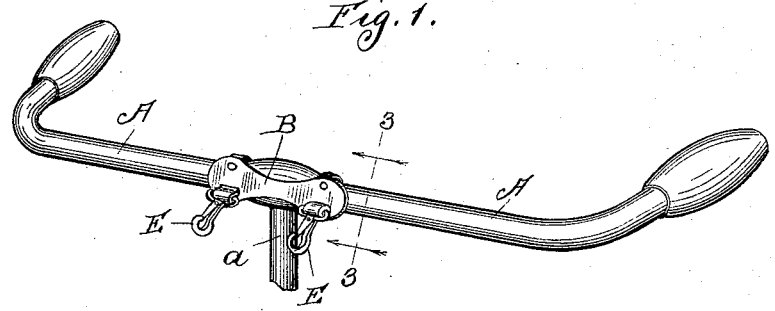

(No Model.)

G. J. HISE.
PACKAGE CARRIER FOR BICYCLES.

No. 571,132. Patented Nov. 10, 1896.

Witnesses:
R. J. Jacker,
J. F. Harrison,

Inventor:
George J. Hise:
By Brown & Brown
Atty's.

THE NORRIS PETERS CO., PHOTO-LITHO., WASHINGTON, D. C.

UNITED STATES PATENT OFFICE.

GEORGE J. HISE, OF CHICAGO, ILLINOIS.

PACKAGE-CARRIER FOR BICYCLES.

SPECIFICATION forming part of Letters Patent No. 571,132, dated November 10, 1896.

Application filed June 24, 1896. Serial No. 596,669. (No model.)

*To all whom it may concern:*

Be it known that I, GEORGE J. HISE, a resident of Chicago, in the county of Cook and State of Illinois, have invented certain new and useful Improvements in Package-Carriers for Bicycles, of which the following is a specification.

This invention relates to those devices or apparatus designed to be secured to a bicycle for the purpose of affording a ready means of fastening or attaching thereto packages and bundles; and the object of this invention is to obtain a package-carrier which can be quickly and securely placed on a bicycle in such manner that it will remain firmly in position and so that bundles or packages having straps, strings, and the like thereon can be readily secured thereto.

In the drawings accompanying and forming a part of this specification I have illustrated a package-carrier embodying my invention.

Figure 2:
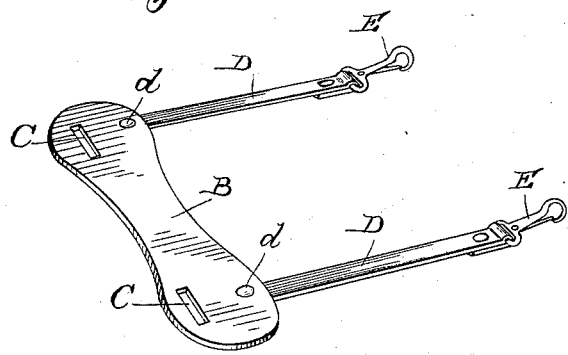

Figure 1 is a perspective view of a handle-bar of a bicycle with the package-carrier attached thereto; Fig. 2, a perspective view of such package-carrier opened out to display the several parts and their relative position, and Fig. 3, an enlarged sectional view thereof on line 3 3 of Fig. 1 viewed in the direction indicated by the arrows.

A reference-letter applied to designate a given part is used to indicate such part throughout the several figures of the drawings wherever the same appears.

A is a bicycle-handle, $a$ being the post thereof.

B is a plate having perforations C C therein.

D D are straps secured to plate B, as at $d$ $d$.

E E are snap-hooks on straps D D, respectively.

Plate B may be made of metal, leather, or other suitable material.

Figure 3:
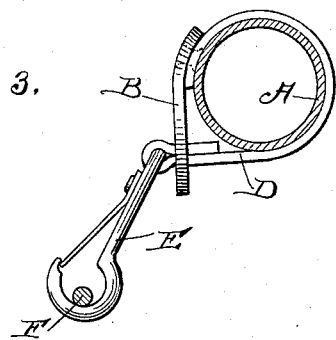

To place the package-carrier embodying my invention on the handle-bar A, (such handle-bar being the preferable place for attaching it to a bicycle,) the plate B is placed in front of such handle-bar, as in Figs. 1 and 3, and the snap-hooks inserted through the openings C C, respectively, in such plate B and extended therethrough, so that the straps D D are in close contact with the handle-bar, as in Fig. 3.

To secure a package or bundle having a string, strap, or cord thereon, it is simply necessary to snap the hook E over such string, strap, or cord, as at F, Fig. 3, when such bundle or package will be thereby held securely in place on the bicycle.

Having thus described my invention, what I claim as new, and desire to secure by Letters Patent, is—

1. A package-carrier for bicycles consisting of a plate having holes, straps attached to the plate so as to extend around a tube and through the holes, and means at the ends of the straps to secure a cord or string; substantially as described.

2. A package-carrier for bicycles consisting of a plate having holes, straps attached to the plate so as to extend around a tube and through the holes and hooks on the ends of the straps; substantially as described.

GEORGE J. HISE.

In presence of—
 CHARLES TURNER BROWN,
 C. PETERMAN.